Dec. 24, 1929. J. T. RAMSDEN 1,741,116
MOLDING MACHINE
Filed June 6, 1928 5 Sheets-Sheet 2

WITNESS:
R. H. R. Kitchel.

INVENTOR
John T. Ramsden
BY
Augustus B. Stoughton
ATTORNEY.

Dec. 24, 1929.   J. T. RAMSDEN   1,741,116
MOLDING MACHINE
Filed June 6, 1928   5 Sheets-Sheet 4

WITNESS:

INVENTOR
John T. Ramsden
BY
Augustus B. Stoughton
ATTORNEY.

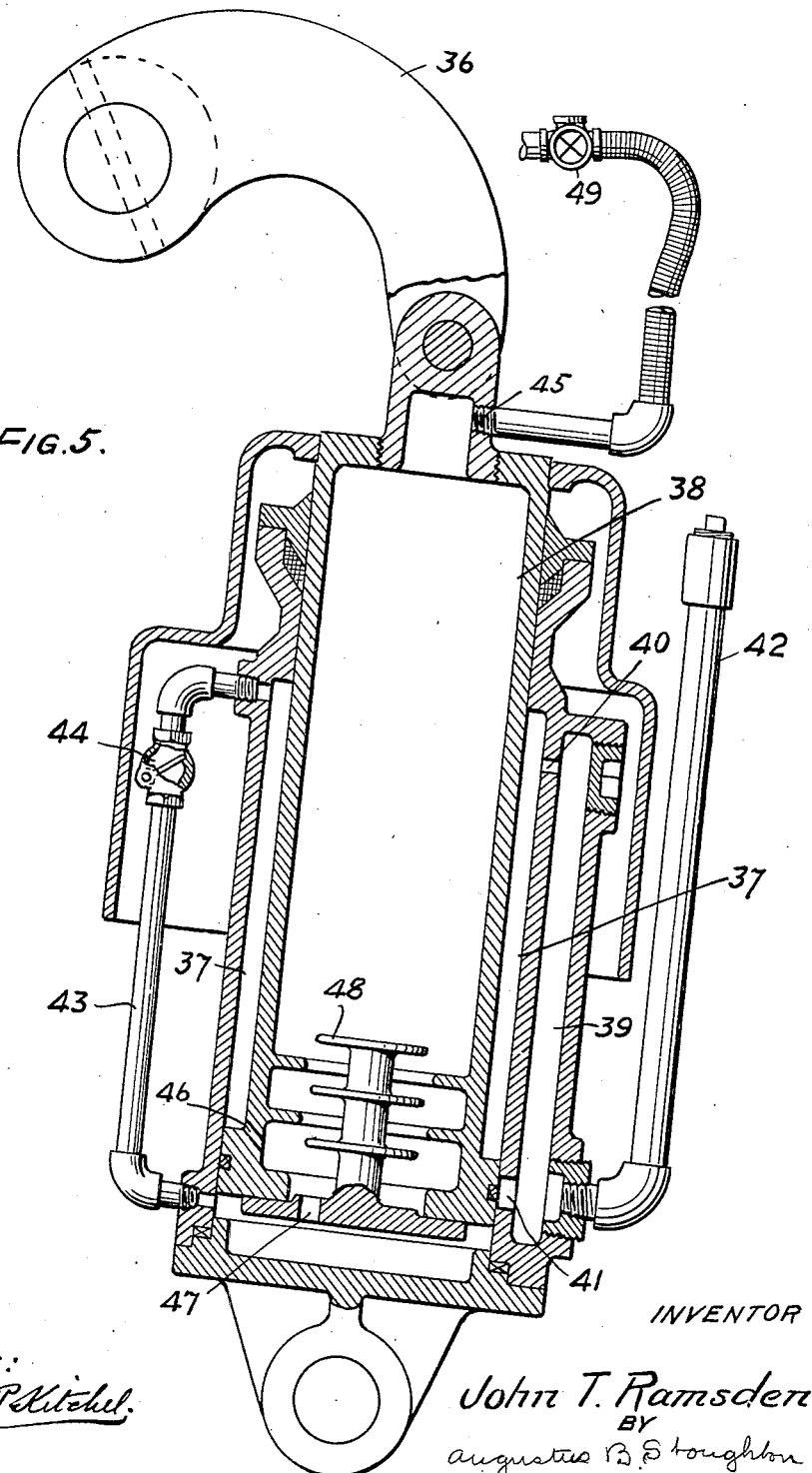

Patented Dec. 24, 1929

1,741,116

UNITED STATES PATENT OFFICE

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

MOLDING MACHINE

Application filed June 6, 1928. Serial No. 283,227.

The present invention relates to molding machines of the type employed for multiple molding in which, generally stated, molds are made in both faces of individual flasks which are stacked and poured as a unit.

Objects of the invention are, first, to provide a molding machine adapted to successfully make molds of the character stated and to do the work rapidly, accurately and with certainty; second, to provide for accurately guiding the working parts in their required movements and for properly limiting and checking such movements; third, to facilitate such manual work as is required, for instance, the work of freeing a top head pattern from sand; and fourth, to regulate and control the air and oil pressures employed for doing the work in such a way that the work is done smoothly and rapidly.

To these and other ends hereinafter set forth the invention comprises the improvements to be presently described and finally claimed.

In the following description reference will be made to the accompanying drawings illustrating one embodiment of the invention and in which Figure 1 is a front elevational view showing certain of the parts in section and certain of the parts broken away.

Fig. 3A is a sectional view illustrating a detail of construction.

Fig. 5 is a view principally in central section and drawn to an enlarged scale and illustrating in detail the parts indicated at the right in Fig. 1.

Figure 1:
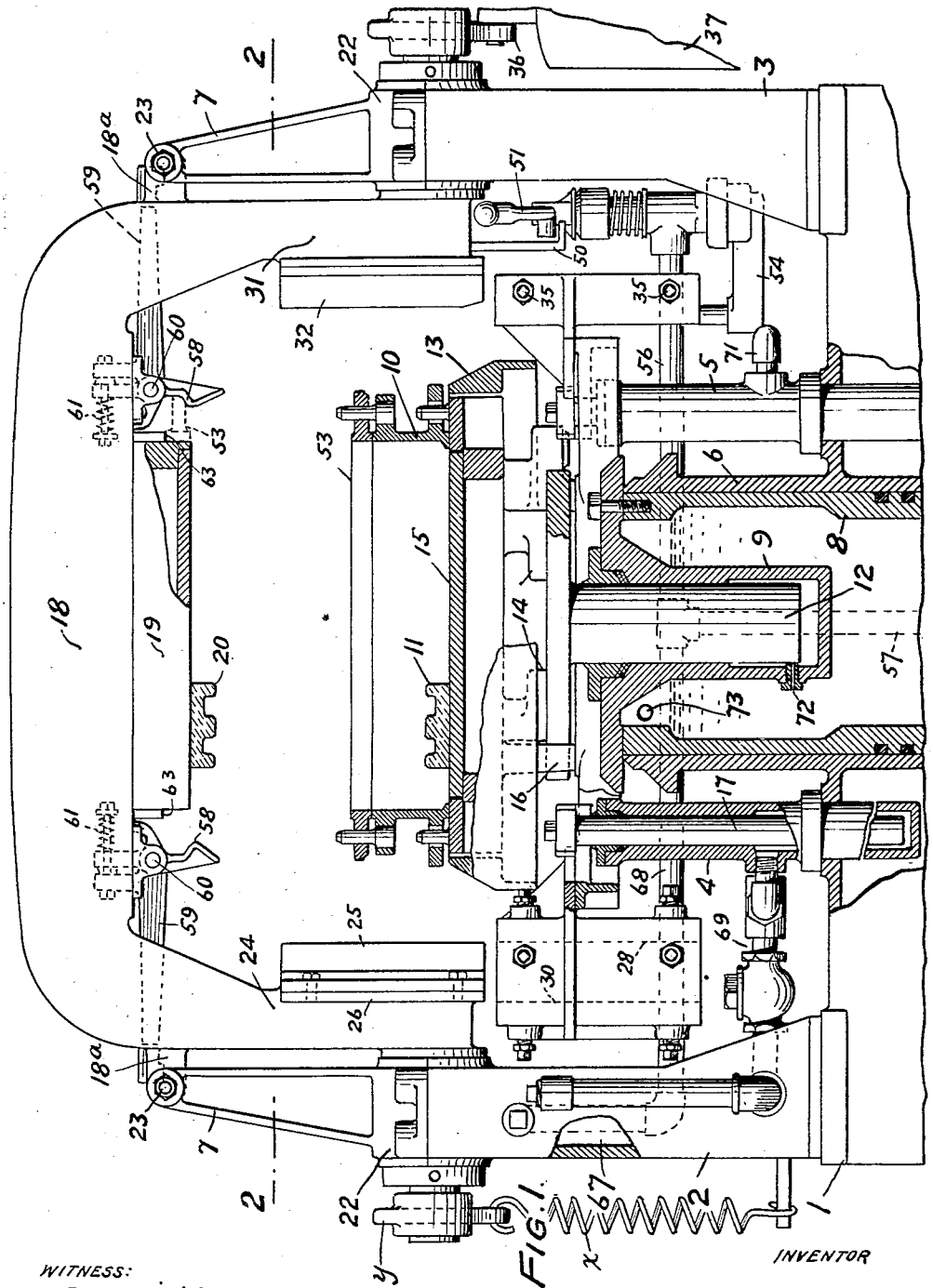

In the drawings 1 is the fixed frame and integral with it or attached to it are columns 2 and 3, casings 4 and 5, and the cylinder 6, which will be referred to as the squeezing cylinder. To the columns are secured stop arms 7. 8 is a hollow squeezing piston, and it is provided with a cylinder 9 which raises the flask 10 in respect to the lower pattern indicated at 11. The piston 12 of the cylinder 9 is connected with the flask frame 13 by feet 14. The piston 8 is connected with the pattern plate 15 by feet 16. The piston 8 is also connected with plungers 17 that work in the casings 4 and 5. It results from this construction that when the piston 8 rises it carries wit it the flask 10, the flask frame 13, the pattern 11, and the piston and cylinder 9 and 12 in the relative positions shown in Fig. 1. When the piston 8 is at rest and the piston 12 is moved upward in respect to its cylinder 9, the result is that the flask frame 13 is raised in respect to the pattern plate 15 and the other parts remain in the positions described. 18 is a yoke swingable about a horizontal axis and to it is secured the pattern carrier 19 and top pattern 20.

Figure 3:
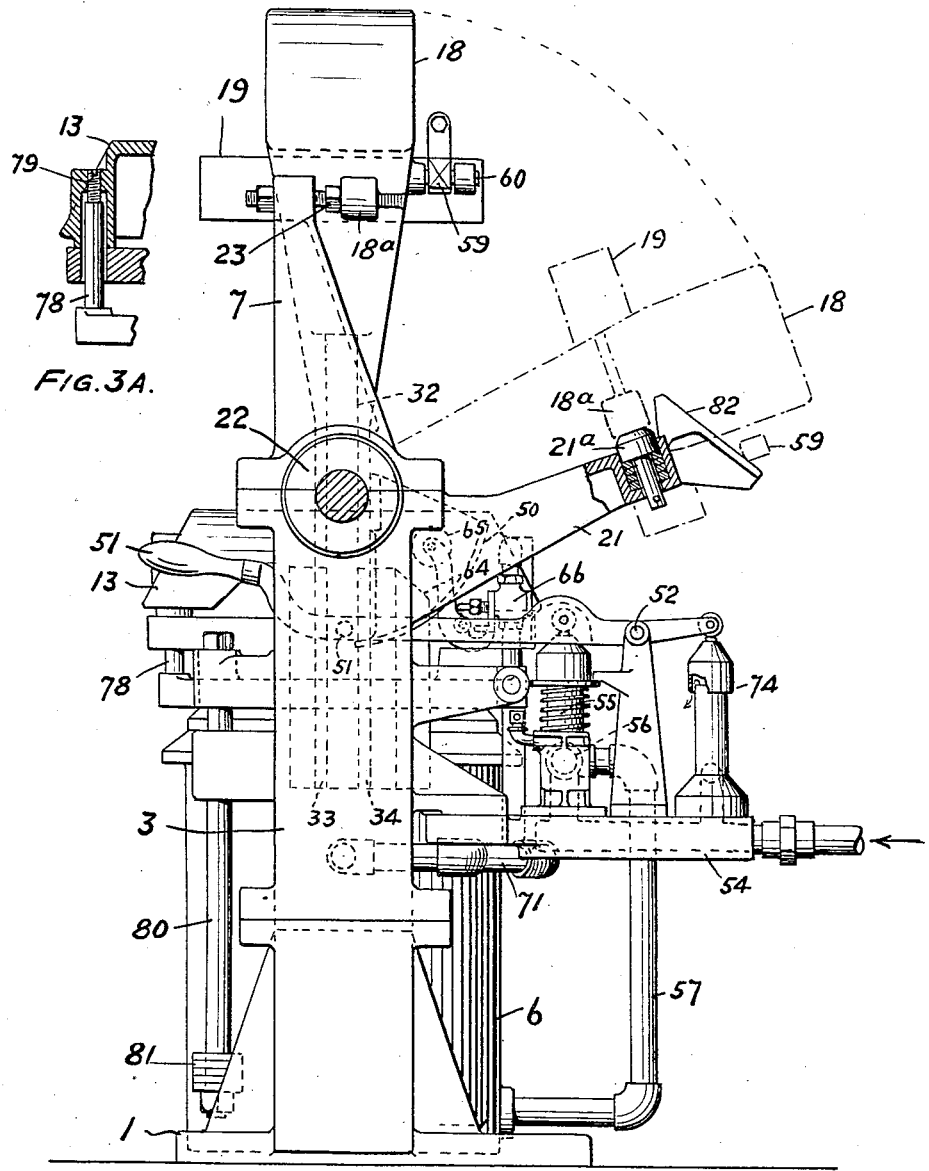
Fig. 3 is an end view looking toward the left in Fig. 1 with certain of the parts removed and with other parts in section.

This yoke occupies a vertical position, as shown in Fig. 3, and also an inclined position, as indicated by dotted lines in that figure, resting upon the back stop 21 or more accurately with the side lugs 18$^a$ resting on buffers 21$^a$ in the back stops. The horizontal axis of the yoke is comparatively high from the base 1 and is provided by bearings 22 at the top of the columns 2 and 3 which extend, in a general way, up to the low level of the squeezing head. The purpose is to afford access for cleaning the patterns 20 from sand when the yoke is in inclined position. In other words, the patterns 20 are presented to the operator at such height that he can readily and conveniently brush them off. It is of course important that, when the piston 8 and parts carried thereby are lifted up in respect to the yoke 18, alignment should be preserved in the mold.

Figure 2:
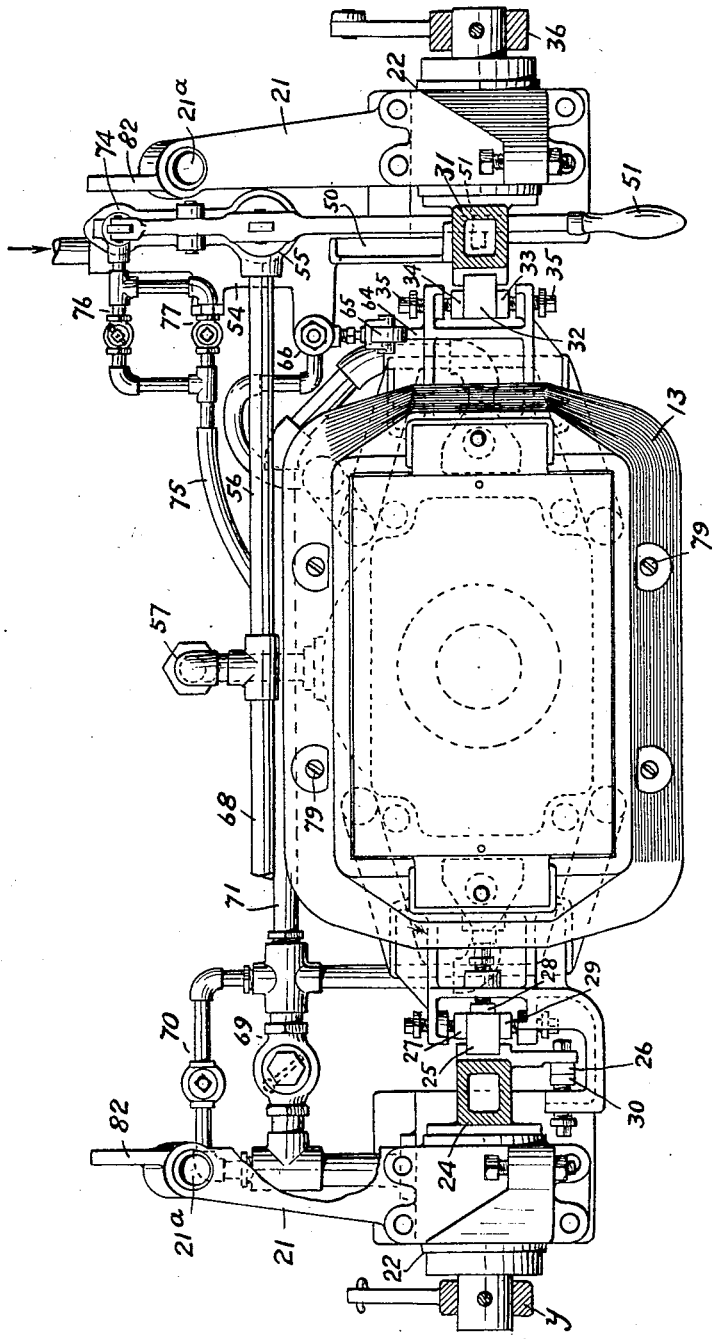
Fig. 2 is a top or plan sectional view on the line 2—2 of Fig. 1 with the flask and sand frame omitted.

For this purpose the yoke is held in a vertical position against the stop 7 in a manner that will be described, the position of the yoke being accurately adjusted by the adjustable stops 23, Fig. 3, and all the parts carried by the piston 9, including the pattern plate 15 and patterns 11, are guided in their upward movement in respect to the yoke by guide mechanism which will now be described. On the arm 24 of the yoke 18 there is a guide consisting of two upright bars 25 and 26, Fig. 2, which may also be referred to as rails. On the head of the piston 8 or attached to some part carried by it are four rail guides 27, 28, 29 and 30, of which 27, 28 and 29 bear on three faces of the bar 25, and of which 30 bears on the bar 26, thus at one end of the machine the parts are guided against lateral movement in four directions. At the other, right hand in the drawings, side of the machine, there is secured to the arm 31 of the yoke a guide strip or rail 32.

On the head of the piston 8 or on some part carried by it, there is a pair of strips or rails 33 and 34, and they slide on the front and back faces of the rail or guide 32, so that at this side of the machine the piston head is not guided in the direction of the width of the machine. The described construction leaves the pattern plate guided in four directions at the left hand side and in two directions at the right hand side, thus compensating for expansion and contraction.

It may be remarked that set screws 35 are provided and by their provision very accurate adjustment of the guides may be readily obtained. The guides on the yoke and the guides on the piston 8 or flask frame clear each other and are out of alignment except when the yoke is in vertical position against its stop 7 and when the piston 8 and parts carried thereby are in their lowest position; then they are in alignment. To turn the yoke there is interposed between an arm 36 on its trunnion and the base or other fixed support the piston and cylinder mechanism illustrated in Fig. 5. At the opposite end there is a similar arm $y$ connected with the base by a spring, indicated at X Fig. 1. 37 is a cylinder and 38 is a hollow piston. 39 is a chamber ported at 40 and at 41 to the interior of the cylinder near the top and bottom thereof and connected with a filling pipe 42 by means of which the apparatus is filled with oil. 43 is a by-pass connected with the top and bottom of the cylinder and provided with a check valve 44 arranged to close on the down flow of the oil. 45 is an air inlet to the top of the piston and the piston is provided with a small opening 46 and with an opening 47 and with a baffle 48.

The operation of this mechanism will be described later.

At some convenient point there is a valve 49 by means of which air under pressure is admitted to the cylinder 38 on top of the oil or permitted to escape. In operating the machine it is the object to limit the speed of travel of the yoke as it approaches its extreme positions. By opening the valve 49 air is admitted on top of the oil in the cylinder 38. Oil leaks slowly through 46 so that the piston starts slowly. As the piston rises the port 41 is uncovered and the speed is accelerated until the lower head of the piston covers the port 40 and then the speed is reduced but the pressure on the yoke is continued so as to hold it up to the stop 23, Fig. 3. When the valve 49 is turned to exhaust air, the check valve 44 automatically opens and the piston 38 descends by gravity assisted by a starting spring $x$ under the control of leakage and so starts slowly and finishes its stroke slowly.

When the yoke is in vertical position a quadrant stop 50 clears the handle 51, Fig. 1, in such a way that it can be operated about its fulcrum 52, Fig. 3.

It will now be assumed that the flask is on the flask frame 13 and that the sand frame 53 is on the flask and that the flask has been filled with sand and struck off. To squeeze the mold against the yoke, or more accurately against the part 19, the lever 51 is pushed down, Fig. 3. Air under pressure is admitted to the box 54 and the depression of the valve 55 causes air to pass by pipe 56, Fig. 2, and 57, Fig. 3, into the cylinder 6, so that the piston 8 and all the parts carried by it rise. The guide mechanism, heretofore described and generally indicated at 25 and 32, comes into action and the sand is squeezed by the part 19 which enters the sand frame, as indicated by dotted lines at the right in Fig. 1. 58 indicates hooks pivoted to the yoke and 59 indicates arms. The hooks and the arms are pivoted at 60 and they are provided with extensions operated upon by a spring 61 operative in compression, so that the arm 59 and its left hand end rest upon the yoke, and the spring 61 pushes the hook 58 into locking position. The object of the construction is that shock from the sand frame onto the hook is absorbed by the spring and not transmitted to the arm.

Figure 4:
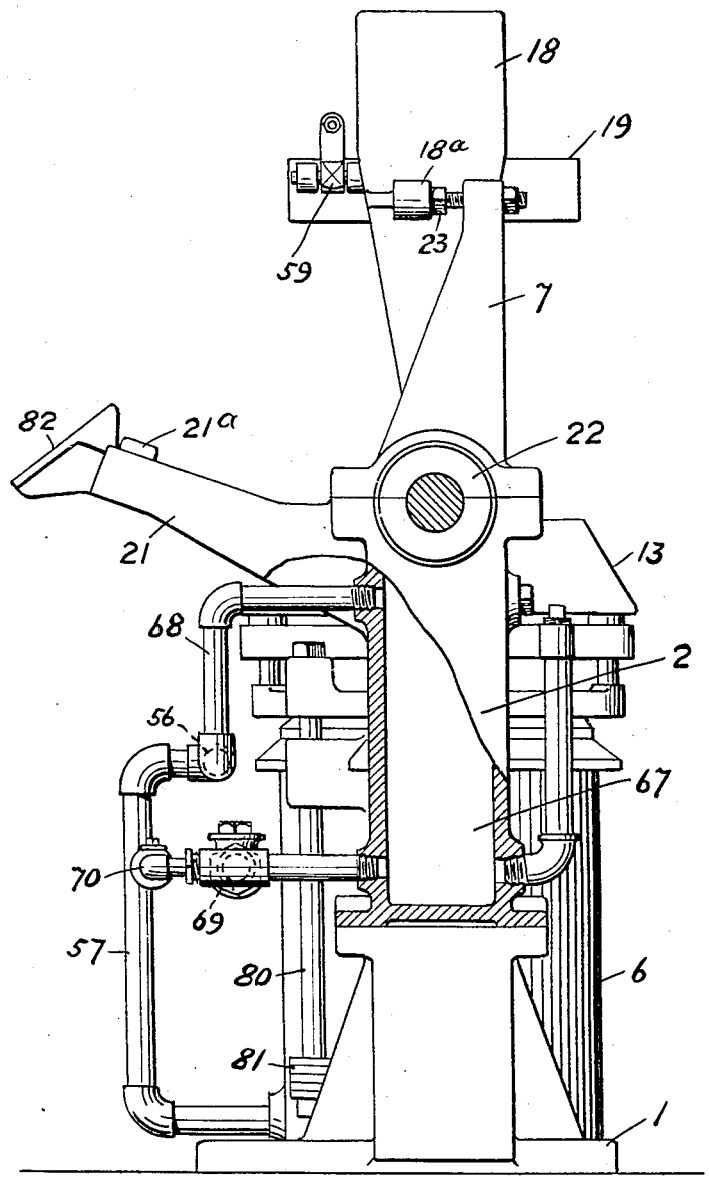
Fig. 4 is an end view looking toward the right in Fig. 1 with parts in section.

The stops 63 on the ramming or squeezing head serve to limit the travel of the sand frame so that it may project very slightly below the element 19 and in this way there is left on top of the flask sufficient sand to provide, when the flasks are stacked, sand joints between them. As the lower ramming head rises a cam 64 carried by it, Fig. 3, runs under the roller 65 opening the valve 66 which supplies air to the vibrators, not shown because too well understood to require illustration or further description. During the rising motion of the lower ramming head, oil is introduced into the casings 4 and 5 under the plungers 17. This oil is supplied from a reservoir 67, Figs. 1 and 4, provided within the column 2. For this purpose air from the valve 55 is delivered by the pipes 56 and 68, Fig. 4, to the top of the oil in the container 67. There are two paths for the passage of the oil. One path 69 contains a check valve opening in the direction of travel of the oil for raising the lower ramming head, and the other path 70 contains a hand set valve for restricting the passage of the oil in the direction for lowering the ramming head in order to draw the flask 10 away from the pattern 20. The pipe 71 connects the casing 5 with the pipe 69. It may be remarked that the downward travel of the lower ramming head is at a uniform rate throughout but is slower than the upward stroke of the lower ramming head.

To draw the lower pattern 11, the flask frame and flask are lifted by the piston 12. This should be a slow movement and it is accomplished by forcing oil from the interior of the piston 8 through the orifice 72. For this purpose air is introduced into the hollow plunger 8 above the level of the oil as at 73. For this purpose the handle 51 is raised opening the valve 74, and from this valve air passes to the flexible connection 75, Fig. 2, that communicates with the inlet 73 by way of two branches 76, which contains a check valve and 77 which contains a hand set restriction valve so that the flask is raised from the pattern slowly and is delayed in that position by the exhaust through the valve in 77 and the valve 74 long enough for the operator to remove the flask before the flask frame 13 descends.

It is of course desirable to accurately position the sand frame and the flask in respect to the upper ramming head.

Referring to Fig. 3A, the posts 78 rising from the lower ramming head enter sockets in the under side of the flask frame and the flask frame carries adjusting screws 79 of which the points bear on top of the posts, so that by adjusting the screws 79 the flask can be accurately positioned. By this construction the adjusting screws are kept clear of sand. Of course it is not intended that the lower ramming head should be shot up unless the yoke is in position to receive its thrust with a flask ready to be squeezed but in the event that the lower head is shot up when there is no flask ready to be squeezed, there are provided limit stop rods 80, Figs. 3 and 4, having end cushioning heads 81 which arrest the upward travel of the squeezing head. When the yoke is inclined the lower head is locked against upward movement.

After both patterns have been removed from the sand at the top and bottom of the flask, the yoke 18 is swung back into the position indicated by dotted lines in Fig. 3 carrying with it the sand frame 53. During this motion the arm 59 rides on the cam 82 on the back stop 21, Fig. 3, and in that way unhooks the hooks 58, so that having removed the flask and mold the operator can conveniently remove the sand frame and at the same time dust or clean the patterns on the upper ramming head.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. In a molding machine the combination of a fixed frame, a yoke swingable about a horizontal axis provided by the fixed frame, stops on the fixed frame, power means for holding and pressing the swinging yoke in vertical position against said stops, a lower squeezing head, means for shooting the lower squeezing head upwards in respect to the yoke, and guides consisting of rails adjustable on the arms of the yoke and on the squeezing head.

2. In a molding machine the combination of a fixed frame, a squeezing head adapted to carrying a lower pattern and vertically movable in respect to said frame, columns on the fixed frame extending upward generally level with the squeezing head when in low position, and a yoke pivoted to said columns for swinging motion about a horizontal axis and adapted to carry an upper pattern, whereby when the yoke is in inclined position access is afforded for cleaning the upper pattern.

3. In a molding machine the combination of a fixed frame, a yoke pivoted to said frame for swinging motion about a horizontal axis and provided with an element for receiving a sand frame, a squeezing head movable in respect to the fixed frame and adapted to present a sand frame to said element, hooks carried by said yoke and adapted to mechanically lock said frame, a back stop for the yoke in inclined position, and an arm and cam face interposed between the hooks and back stop whereby the hooks are automatically disengaged from the sand frame when the yoke is in inclined position.

4. In a molding machine the combination of a yoke having an element adapted to receive a sand frame, a squeezing head adapted to present a sand frame to said element, a hook pivoted to the yoke and adapted to engage the sand frame, an arm pivoted to the yoke concentrically with the hook and having one end adapted to rest on the yoke and the other end projecting therefrom, there being provided ears on the arm and hook, and a spring device interposed between the ears whereby impact of a sand frame with the hook is absorbed by the spring and diverted from the arm.

5. In a molding machine the combination of a yoke swingable about a horizontal axis and provided with an element for receiving a sand frame and with a stop for the sand frame, a squeezing head provided with a flask frame adapted to present a flask and a sand frame to said element and stop, posts carried by the squeezing head and arranged in sockets provided in the flask frame, and set screws arranged in the top walls of the sockets and adapted to rest on the tops of the posts and to provide adjustment.

6. In a molding machine the combination of a fixed frame, a swingable yoke pivoted to the fixed frame about a horizontal stationary axis and adapted to carry a top pattern, a lower squeezing head adapted to carry a flask frame, a squeezing piston and cylinder and oil casings and plungers interposed between the fixed frame and the squeezing head, means for applying pressure to the squeezing cylinder to shoot the lower squeezing head upward with free entrance of oil into the casings, and means for checking the exit of oil from the casings to lower the squeezing head with its flask frame at substantially constant speed slower than its ascending motion and uniform throughout its descent.

7. In a molding machine the combination of a fixed frame, a yoke, a squeezing cylinder, a hollow squeezing piston adapted to contain oil, a squeezing head adapted to be shot upward by said piston in respect to the yoke and adapted to carry a bottom pattern, a flask frame provided with a plunger, a pattern drawing cylinder for said plunger arranged within the squeezing piston and having an orifice for the passage of oil, and means for applying pressure to the oil in the squeezing piston to force it into said pattern drawing cylinder to raise the flask frame in respect to the squeezing head to draw the bottom pattern.

8. In a molding machine the combination of a yoke pivoted about a horizontal stationary axis, a squeezing head, a fixed frame, means for shooting the squeezing head against the yoke, casings and plungers respectively connected with the frame and head, an oil reservoir, means for applying air pressure to the oil in the reservoir, and pipe connections between the reservoir and casing and including branches of which one is fitted with a check valve and of which the other is fitted with a set valve whereby the squeezing head can be shot up rapidly and lowered more slowly and with a substantially uniform speed of travel throughout its descent.

JOHN T. RAMSDEN.